US008857789B2

(12) United States Patent
Ogawa et al.

(10) Patent No.: US 8,857,789 B2
(45) Date of Patent: Oct. 14, 2014

(54) SOLENOID TYPE ELECTROMAGNETIC VALVE DEVICE

(75) Inventors: Hisao Ogawa, Kanagawa (JP); Masaki Toda, Kanagawa (JP); Toshikazu Ueki, Kanagawa (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 338 days.

(21) Appl. No.: 12/866,523

(22) PCT Filed: Oct. 19, 2009

(86) PCT No.: PCT/JP2009/068007
§ 371 (c)(1),
(2), (4) Date: Aug. 20, 2010

(87) PCT Pub. No.: WO2010/047306
PCT Pub. Date: Apr. 29, 2010

(65) Prior Publication Data
US 2011/0001073 A1 Jan. 6, 2011

(30) Foreign Application Priority Data
Oct. 21, 2008 (JP) ................................ 2008-271109

(51) Int. Cl.

| | |
|---|---|
| ***F16K 31/02*** | (2006.01) |
| ***F16K 31/06*** | (2006.01) |
| ***F02M 47/02*** | (2006.01) |
| ***F02M 61/16*** | (2006.01) |
| ***H01F 7/128*** | (2006.01) |
| ***F02M 63/00*** | (2006.01) |

(52) U.S. Cl.
CPC ........... *F02M 47/027* (2013.01); *F02M 61/166* (2013.01); *F02M 2200/02* (2013.01); *H01F 7/128* (2013.01); *F02M 2200/04* (2013.01); *F02M 63/0019* (2013.01)
USPC .................................................... 251/129.16

(58) Field of Classification Search
USPC .................................................... 251/129.16
See application file for complete search history.

(56) References Cited

U.S. PATENT DOCUMENTS 3,667,686 A 6/1972 Garnier
4,925,155 A * 5/1990 Carman ....................... 251/117

(Continued)

FOREIGN PATENT DOCUMENTS

JP 50-42157 4/1975
JP 3-97905 10/1991

(Continued)

OTHER PUBLICATIONS

International Preliminary Report on Patentability and Written Opinion of the International Searching Authority issued Apr. 26, 2011 in International (PCT) Application No. PCT/JP2009/068007 with English translation.

(Continued)

*Primary Examiner* — Stephen M Hepperle
*Assistant Examiner* — Seth W Mackay-Smith
(74) *Attorney, Agent, or Firm* — Wenderoth, Lind & Ponack, L.L.P.

(57) ABSTRACT

A solenoid type electromagnetic valve is configured such that an attraction force arises between an attracting side face of a solenoid core power supply body and an attracted side face of an armature which is facing the attracting side face when a current is conducted through a solenoidal coil, while the attraction force is released between the attracting side face and the attracted side face when the current conducted through the solenoidal coil is cut off, wherein at least one plate member of nonmagnetic material comprising nonmagnetic stainless steel, aluminum alloy or ceramic material is fitted to the attracting side face of the solenoid core power supply body, and fluid insulation resin is filled therein, thereby the fluid insulation resin is solidified and secures the plate member thereto.

5 Claims, 3 Drawing Sheets

(56) References Cited

U.S. PATENT DOCUMENTS

| | | | | | |
|---|---|---|---|---|---|
| 5,152,145 | A | * | 10/1992 | Miotke et al. | 60/602 |
| 5,560,549 | A | * | 10/1996 | Ricco et al. | 239/533.8 |
| 5,566,921 | A | * | 10/1996 | Yokota et al. | 251/129.22 |
| 5,791,531 | A | * | 8/1998 | Hassler, Jr. | 222/504 |
| 7,383,819 | B1 | | 6/2008 | Ogawa et al. | |
| 2003/0042456 | A1 | | 3/2003 | Makino | |
| 2006/0185634 | A1 | | 8/2006 | Norton | |

FOREIGN PATENT DOCUMENTS

| | | |
|---|---|---|
| JP | 3-116007 | 12/1991 |
| JP | 4-2622 | 1/1992 |
| JP | 2004-014700 | 1/2004 |
| JP | 2006-177365 | 7/2006 |
| JP | 2006-307870 | 11/2006 |
| JP | 2008-151082 | 7/2008 |

OTHER PUBLICATIONS

Supplementary European Search Report issued Mar. 1, 2013 in corresponding European Application No. 09 82 2003.

Japanese Notice of Allowance mailed Sep. 4, 2012 in corresponding Japanese Application No. 2008-271109 with concise explanation of relevance.

International Search Report issued Nov. 17, 2009 in International (PCT) Application No. PCT/JP2009/068007.

* cited by examiner

SOLENOID TYPE ELECTROMAGNETIC VALVE DEVICE

BACKGROUND OF THE INVENTION

I. Field of the Invention

The present invention relates to an erosion-protecting device for protecting a solenoid type electromagnetic valve from erosion thereof; the solenoid type electromagnetic valve is provided with a plate-type armature that is connected to an end part of a valve body which opens and closes a liquid passage (a fuel passage in a case of a fuel injection device), as well as, a solenoid core power supply body that is provided with a solenoidal coil integrated with the solenoid core in a solenoid case that is filled with the liquid.

II. Description of the Related Art

A solenoid type electromagnetic configured such that a plate-type armature connected to an end part of a valve body which opens and closes a fuel passage and a solenoid core power supply body comprising a solenoidal coil integrated with the solenoid core in a solenoid case that is filled up with the fuel are provided, and an attracting side face of the solenoid core power supply body attracts an armature when current is conducted through the solenoidal coil, while the attraction force between the attracting side face of the solenoid core power supply body and the attracted side face of the armature is released when the current conducted through the coil is cut off, are often used for fuel injection devices of diesel engines.

FIG. 3 shows an example of the solenoid type electromagnetic valve device according to a conventional technology.

The solenoid type electromagnetic valve device as shown in FIG. 3 comprises a plate-type armature 6 that is directly connected to an end part of a control valve (not shown) for opening and closing a fuel passage (not shown), as well as a solenoid core power supply body 101 that is provided with a solenoid core 11 integrated with a solenoidal coil 3 and housed in a solenoid case 2 of a box shape filled up with the fuel oil.

In the solenoid core power supply body 101, the solenoidal coil 3 is configured so that the coil 3 is placed around a middle protrusion part of an E-shaped solenoid core 11, the middle protrusion part being formed between a pair of grooves 11*a* as shown in FIG. 2; because of the pair of grooves 11*a*, the E-shape of the solenoid core 11 is formed; the interstices between the solenoid core 11 and the solenoidal coil 3 are filled with an insulation resin material that can be solidified after being filled.

The solenoid core power supply body 101 is housed in a housing 1; the housing 1 is fastened to a valve case it via an intermediate piece is having a hollow space therein.

When the solenoidal coil 3 is conducted with current, there arises an attraction force between an attracting side face 15 of the solenoid core power supply body 101, namely the lower end surface thereof, and an attracted side face 6*b* of the armature 6. The attraction force makes the attracting side face 15 attract the attracted side face 6*b* in a direction toward the side face 15 against the counterforce due to a spring 8. In addition, the gap between the attracting side face 15 and the attracted side face 6*b* is approximately 0.1 mm.

In this way, the control valve (not shown) that is fixed to the armature 6 moves (toward in the Y-arrow direction in FIG. 1) and closes the fuel passage (not shown) so that the fuel in a control room (not shown) is pressurized.

In the next place, when the current conducted through the solenoidal coil 3 is cut off, the attraction force between the attracting side face 15 of the solenoid core power supply body 101 and the attracted side face 6*b* of the armature 6 is released so that the control valve (not shown) opens and the pressure in the fuel passage (not shown) is released.

As described above, when the solenoid core power supply body 101 is actuated, the gap between the attracting side face 15 and the attracted side face 6*b* varies within a range of the clearance level of 0.1 mm; and the armature is operated with high-speed responsivity; under such a condition, a pressure change from a positive pressure to a negative pressure and vice versa is repeated in the gap between the attracting side face 15 and the attracted side face 6*b* causing cavitation phenomena to occur in the gap.

JP2008-151082 discloses a solenoid type electromagnetic valve device comprising a plate-type armature connected to an end part of a valve body which opens and closes a fuel passage and a solenoid core power supply body comprising a solenoidal coil integrated with the solenoid core in a solenoid case that is filled up with the fuel.

In the device disclosed by the patent reference, as shown in FIG. 3, when the above-described control valve closes, the pressure increases in the small gap between the attracting side face 15 of the solenoid core power supply body 101 and the attracted side face 6*b* of the armature 6.

Because of this pressure increase, the control valve is kept under a locked condition for preventing the control valve from bouncing; hence, as soon as the control valve is lifted and opened, the pressure in the space in which the armature 6 is housed increases; further, the pressure in the above-described small gap rapidly decreases causing the fluid (liquid, or usually fuel in a case of fuel injection devices) in the housing space of the armature 6 to flow into the small gap. As a result, the surfaces facing the small gap space between the solenoid core power supply body 101 and the armature 6 are prone to be damaged from the cavitation erosion.

Partly because the magnetic core (the iron core) of the solenoid core power supply body 101 is fixed in the solenoid case 2 by filling magnetism-insulation resin material, the erosion damage caused in the event of the cavitation is prone to finally causing a difficulty that is the breaking of the solenoidal coil 3.

Further, according to the disclosure of JP2008-151082, a thin plate-type valve is installed on the backside of the armature having a plurality of passage holes; thus, the armature moves slowly and the high-speed responsivity cannot be expected.

SUMMARY OF THE INVENTION

In view of the difficulties in the conventional technology, the present invention aims at providing a solenoid type electromagnetic valve with high-speed responsivity and enhanced durability, thereby the valve can be protected from the erosion damage due to cavitation, without losing the high-speed responsivity.

In order to overcome the above-described difficulties, the present invention discloses solenoid type electromagnetic valve including a plate-type armature connected to an end part of a valve body which opens and closes a liquid passage; and a solenoid core power supply body comprising a solenoidal coil integrated with the solenoid core in a solenoid case that is filled up with a liquid, the solenoid type electromagnetic valve is configured such that an attracting side face of the solenoid core power supply body attracts an armature when current is conducted through the solenoidal coil, while the attraction force between the attracting side face of the solenoid core power supply body and the attracted side face of the armature is released when the current conducted through the coil is cut off;

wherein at least one plate member of nonmagnetic material is fitted to the attracting side face of the solenoid core power supply body, the attracting side face being opposed to the attracted side face, fluid insulation resin is filled into interstices between the solenoid case and solenoid core power supply body, and the filled insulation resin is solidified.

A preferable embodiment regarding the above disclosure is the solenoid type electromagnetic valve, wherein the material of the nonmagnetic plate member is selected from either one of nonmagnetic stainless steel, aluminum alloy or ceramic material.

Another preferable embodiment regarding the above disclosure is the solenoid type electromagnetic valve, the solenoidal coil of the solenoid core power supply body is wound around a middle protrusion part of the solenoid core formed in an E-shape, and an outlet side of the solenoidal coil facing the attracted side face of the armature is covered by at least one plate member of nonmagnetic material being fitted and fixed thereto.

More concretely, in the above-disclosed solenoid type electromagnetic valve provided with the solenoidal coil wound around the middle protrusion part of the solenoid core formed in an E-shape, at least one plate member of nonmagnetic material is fitted to the attracting side face of the solenoid core power supply body so that the grooves of the E-shaped solenoid core are covered with the plate members of nonmagnetic material from the outlet side 11*b* of the solenoidal coil wound around the middle protrusion part of the E-shaped solenoid core. Since the nonmagnetic material plate members each of which shields magnetism without hindering the function of the solenoidal coil cover the outlet side of the solenoidal coil facing the attracted side face of the armature where is exposed to strong cavitations, the solenoid type electromagnetic valve can be protected from the erosion damage due to cavitations without losing high-speed responsivity.

Further, it is preferable and effective that the plate members of nonmagnetic material seal the grooves of the E-shaped solenoid core integrated with the solenoidal coil, from the outlet side of the solenoidal coil wound around the middle protrusion part of the E-shaped solenoid core, the outlet side facing the attracted side face of the armature. The reason is that the (fuel) oil that is once absorbed around the wires of the solenoidal coil in the grooves of the E-shaped solenoid core integrated with the solenoidal coil is prone to staying there as well as deteriorating the resin filled into the interstice in the grooves.

Further, the material of the plate member may be either of nonmagnetic stainless steel, aluminum alloy or ceramic material. By press-fitting the plate members made of either of these materials and solidifying the filled magnetism-insulation resin, the surface of the solenoid core power supply body the surface which is prone to being exposed to heat attack (besides erosion attack) can be certainly protected by the plate members of nonmagnetic material.

DETAILED DESCRIPTION OF THE INVENTION

Hereafter, the present invention will be described in detail with reference to the embodiments shown in the figures. However, the dimensions, materials, shape, the relative placement and so on of a component described in these embodiments shall not be construed as limiting the scope of the invention thereto, unless especially specific mention is made.

Figure 1:
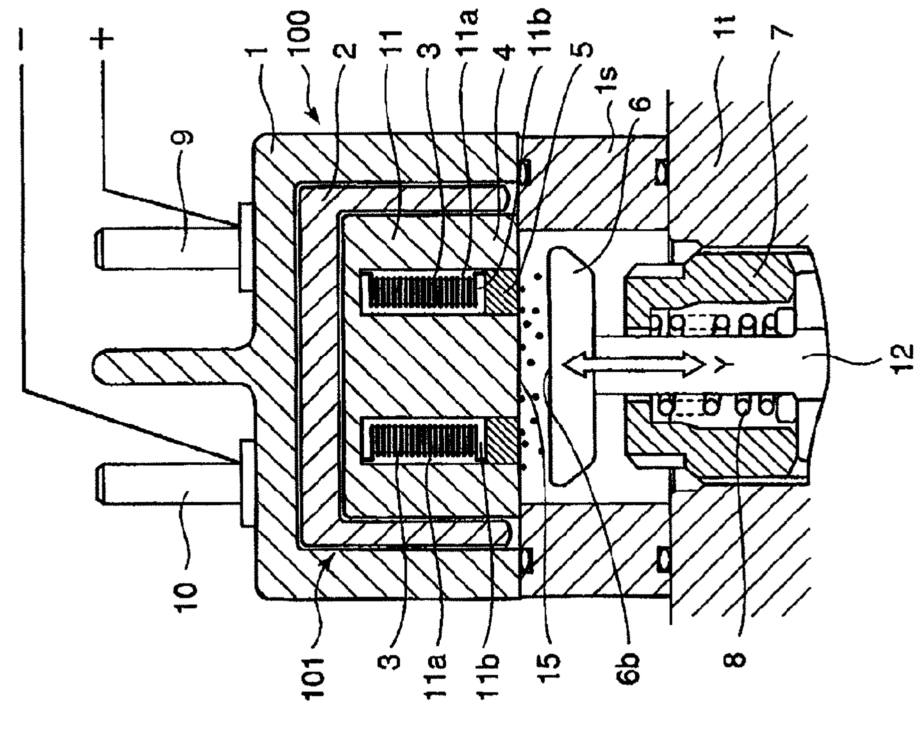
FIG. 1 shows a cross-section of a solenoid type electromagnetic valve according to an embodiment of the present invention.

FIG. 1 shows a cross-section of a solenoid type electromagnetic valve according to an embodiment of the present invention. In FIG. 1, a solenoid device 100 comprises a plate-type armature 6 that is directly connected to an end part of a control valve (not shown) for opening and closing a fuel passage (not shown), as well as a solenoid core power supply body 101 that is provided with a solenoid core 11 integrated with a solenoidal coil 3 and housed in a solenoid case 2 of a box shape filled up with the fuel oil.

In the solenoid core power supply body 101, the solenoidal coil 3 is configured to be wound around a middle protrusion part of the solenoid core 11 which is formed in an E-shape, the middle protrusion part being formed between a pair of grooves 11*a*, and the solenoidal coil 3 is placed so that the coil goes through the pair of grooves 11*a* and a pair of clearances between the protrusion part and the solenoid case 2.

In addition, the solenoid core power supply body 101 is housed in a housing 1, which is fastened to a valve case (a mechanical valve part case) it via an intermediate piece is having a hollow space therein.

When the solenoidal coil 3 is conducted with current, there arises an attraction force between an attracting side face 15 of the solenoid core power supply body 101, namely the lower end surface thereof, and an attracted side face 6*b* of the armature 6. The attraction force makes the attracting side face 15 attract the attracted side face 6*b* in a direction toward the side face 15 against the counterforce due to a spring 8. In addition, the gap between the attracting side face 15 and the attracted side face 6*b* is approximately 0.1 mm.

In this way, the control valve (not shown) that is fixed to the armature 6 moves (toward in the Y-arrow direction in FIG. 1) and closes the fuel passage (not shown) so that the fuel in a control room (not shown) is pressurized.

On the other hand, when the current conducted through the coil 3 is cut off, the attraction force between the attracting side face 15 of the solenoid core power supply body 101 and the attracted side face 6*b* of the armature 6 is released so that the control valve (not shown) opens and the pressure in the fuel passage (not shown) is released.

The configuration as described above is the same as the configuration of the conventional technology.

The present invention provides a solenoid type electromagnetic valve of high-speed responsivity and enhanced durability thereby the valve can be protected from the erosion damage due to cavitations between the attracting side face 15 of the solenoid core power supply body 101 and the attracted side face 6*b* of the armature 6.

In the present invention as shown in FIG. 1, on the side of the attracting side face 15 that is opposed to the attracted side face 6*b*, at least one plate member 5, which is formed as a band plate of nonmagnetic material, is fitted.

In other words, the plate members 5 of nonmagnetic material cover the grooves 11*a* of the E-shaped solenoid core 11 from the outlet side lib of the solenoidal coil 3 wound around the middle protrusion part of the E-shaped solenoid core 11, the outlet side facing the attracted side face 6*b* of the armature 6.

Figure 2:
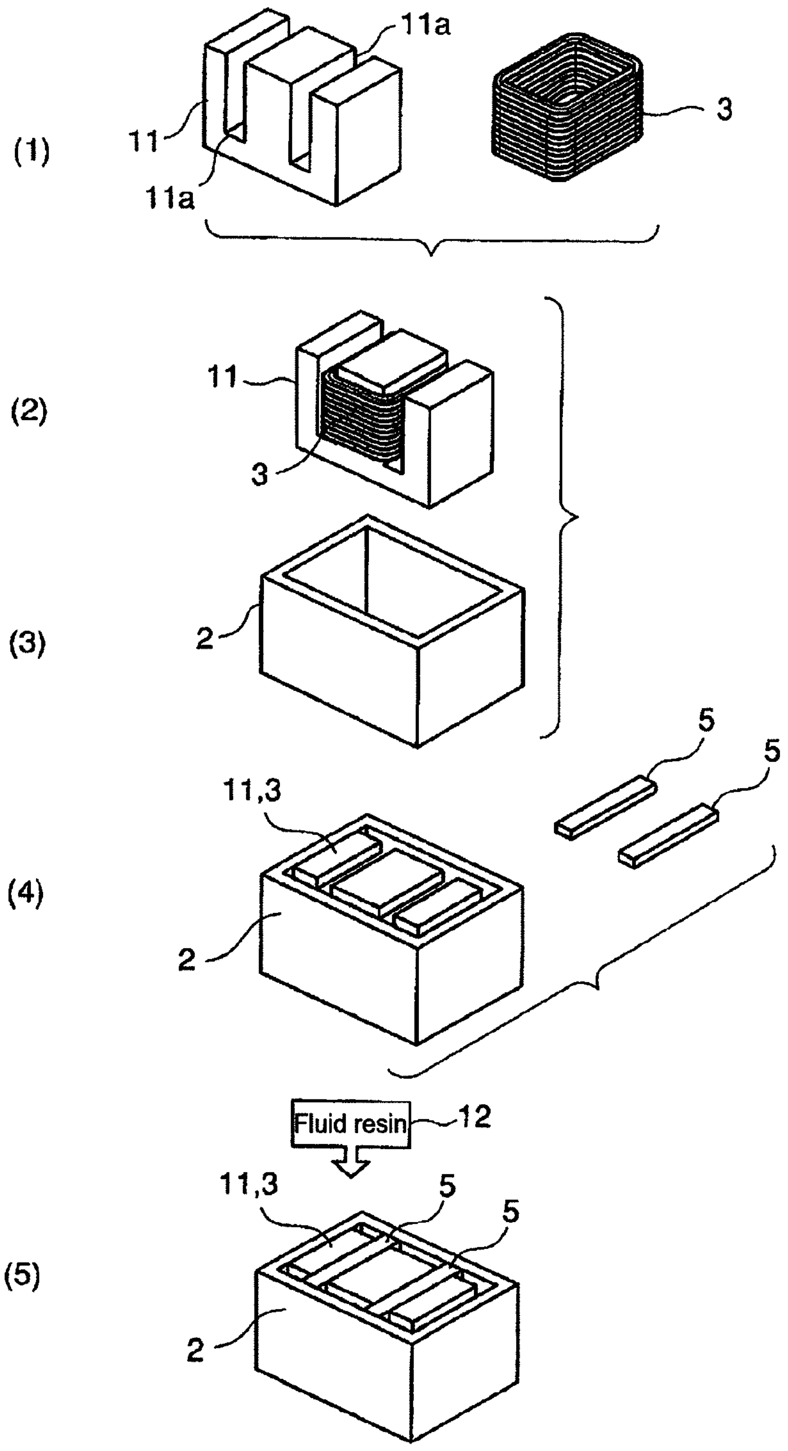
FIG. 2 sequentially shows an assembly procedure as to the parts of the solenoid type electromagnetic valve according to an embodiment of the present invention.
Figure 3:
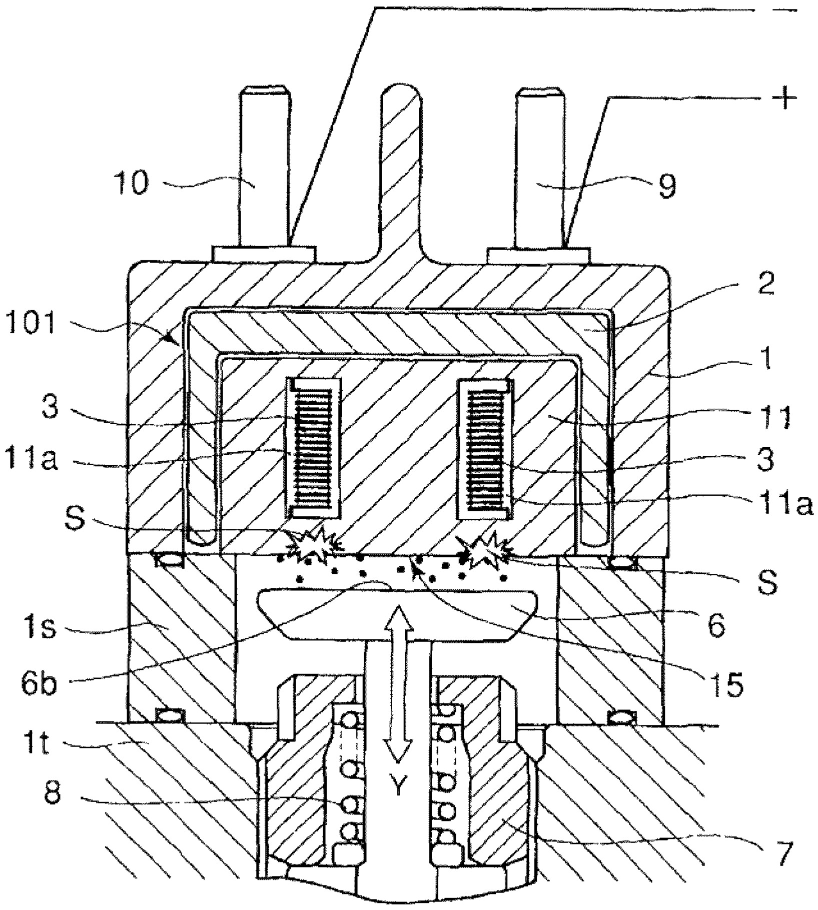
Fig. 3 PRIOR ART
FIG. 3 shows an example of a solenoid type electromagnetic valve according to a conventional technology.

FIG. 2 sequentially shows an assembly procedure as to the parts of the solenoid type electromagnetic valve according to an embodiment of the present invention.

In FIG. 2, the solenoidal coil 3 is wound through the grooves 11*a* of the solenoid core 11 having a form of E-shape (step (1)), and the solenoid core 11 integrated with solenoidal coil 3 is formed (step (2)). Next in order, the solenoid core 11 into which the solenoidal coil 3 is fitted in the E-shape arrangement is housed in the solenoid case 2 (step (3)).

In the next place, the plate members 5 of nonmagnetic material that are prepared apart from the steps in FIG. 2 are press-fitted into the assembled member consisting of the solenoid core 11 and the solenoidal coil 3 (the step (4)).

After that, thermoplastic nonmagnetic resin (fluid resin) 12 is filled into the interstice between the solenoid case 2 and the above-described assembled member into which the plate members 5 of nonmagnetic material are press-fitted, and the filled resin is solidified (the step (5)).

According to the embodiment as described above, the grooves 11*a* of the E-shaped solenoid core 11 are covered with the plate members 5 of nonmagnetic material from the outlet side lib of the solenoidal coil 3 wound around the middle protrusion part of the E-shaped solenoid core 11. Since the nonmagnetic material plate members 5 each of which has a higher softening point and higher hardness than those of the thermoplastic nonmagnetic resin, and which shields magnetism without hindering the function of the solenoidal coil 3 cover the outlet side lib of the solenoidal coil 3 facing the attracted side face 6*b* of the armature 6 where is exposed to strong cavitations, the solenoid type electromagnetic valve can be protected from the erosion damage due to cavitations without losing high-speed responsivity.

Further, it is effective that the plate members 5 of nonmagnetic material cover the grooves 11*a* of the E-shaped solenoid core 11 integrated with the solenoidal coil 3, from the outlet side 11*b* of the solenoidal coil 3 wound around the middle protrusion part of the E-shaped solenoid core 11, the outlet side 11*b* facing the attracted side face 6*b* of the armature 6. The reason is that the fuel oil that is once absorbed around the wires of the solenoidal coil 3 in the grooves 11*a* of the E-shaped solenoid core 11 is prone to stay there as well as deteriorate the resin filled into the interstice in the grooves 11*a*.

As for the material of the plate member 5 of nonmagnetic material, it may be selected as one of nonmagnetic stainless steel, aluminum alloy or ceramic material. By press-fitting the plate members 5 made of either of these materials and solidifying the filled magnetism-insulation resin, the surface of the solenoid core power supply body 101 exposed to heat attack besides erosion attack can be certainly protected by the plate members 5 of nonmagnetic material.

The present invention can provide solenoid type electromagnetic valve of high-speed responsivity and enhanced durability thereby the valve can be protected from the erosion damage due to cavitation, without loosing high-speed responsivity.

The invention claimed is:

1. An electromagnetic solenoid valve comprising:

a valve body having an end part, the valve body being configured to open and close a liquid passage;

an armature plate connected to the end part of the valve body; and a solenoid core power supply body comprising a solenoidal coil integrated with a solenoid core in a solenoid case that is filled with a liquid, wherein the electromagnetic solenoid valve is configured such that an attracting side face of the solenoid core power supply body attracts an attracted side face of the armature plate when current is conducted through the solenoidal coil, while an attraction force between the attracting side face of the solenoid core power supply body and the attracted side face of the armature plate is released when the current conducted through the solenoid coil is cut off, wherein an insulation resin is disposed at a side of the attracting side face of the solenoid core power supply body and at least one plate member of nonmagnetic material is disposed at an outer side of the insulation resin so that the at least one plate member is at a facing side of the attracting side face of the solenoid core power supply body so as to bypass the insulation resin and face the armature plate, the at least one plate member having a higher softening point and a higher hardness than the insulation resin, wherein the at least one plate member of nonmagnetic material has an outermost periphery and a surface facing the attracted side face of the armature plate, the surface being a planar surface extending over an entirety of an area defined by the outermost periphery, and wherein the surface of the at least one plate member of nonmagnetic material is free from resin.

2. The electromagnetic solenoid valve according to claim 1, wherein the nonmagnetic material of the at least one plate member is selected from one of nonmagnetic stainless steel, aluminum alloy and ceramic material.

3. The electromagnetic solenoid valve according to claim 1, wherein the solenoidal coil of the solenoid core power supply body is wound around a middle protrusion part of the solenoid core formed in an E-shape, and an outlet side of the solenoidal coil facing the attracted side face of the armature plate is covered by the at least one plate member of nonmagnetic material being fitted and fixed thereto.

4. The electromagnetic solenoid valve according to claim 1, wherein the insulation resin is disposed in interstices between the solenoid core and the solenoid coil.

5. The electromagnetic solenoid valve according to claim 1, wherein the insulation resin is disposed so as to be between the solenoid case and the at least one plate member of nonmagnetic material.

* * * * *